H. EILERS.
HAY LOADER.
APPLICATION FILED JAN. 17, 1910.
1,005,524.
Patented Oct. 10, 1911.
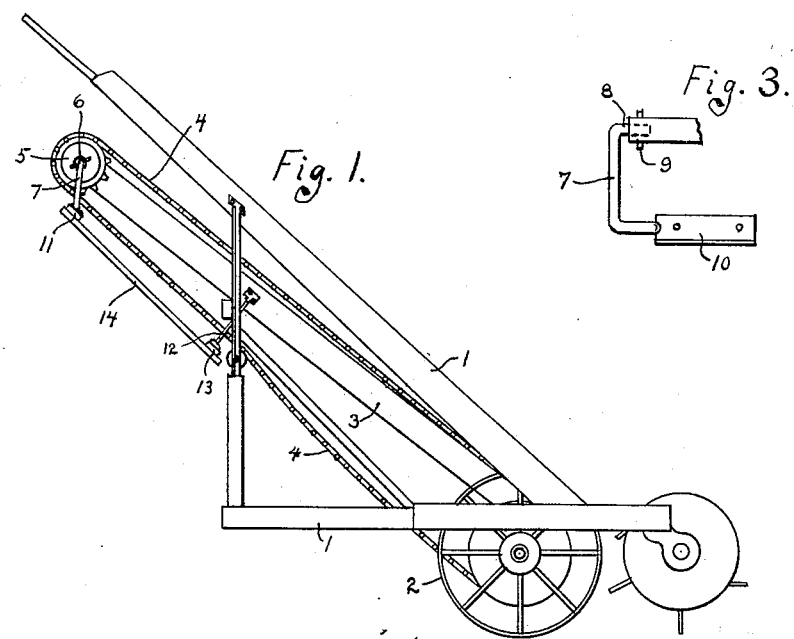
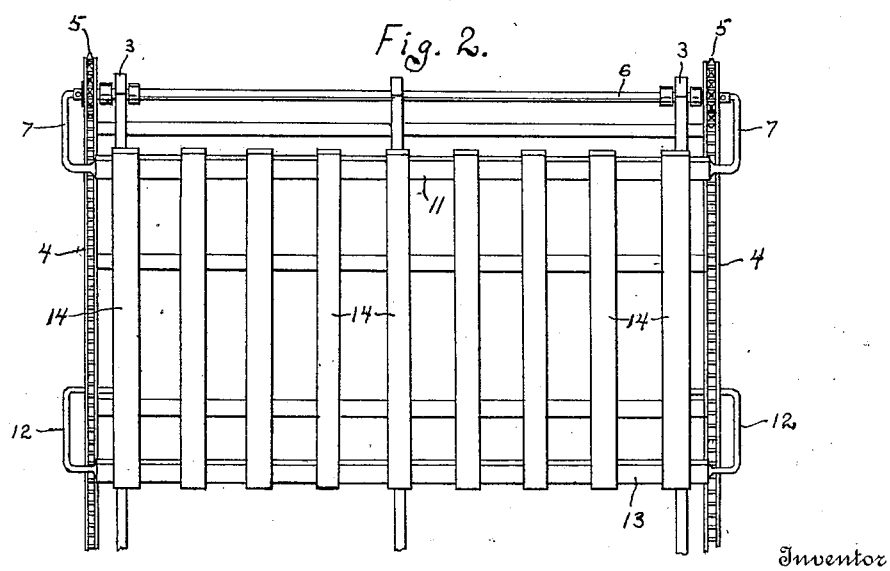
Witnesses
Walter G. Reed
Noble B. Ridge
Inventor
Henry Eilers,
By Walter N. Haskell,
his Attorney

UNITED STATES PATENT OFFICE.

HENRY EILERS, OF EMERSON, ILLINOIS.

HAY-LOADER.

1,005,524. Specification of Letters Patent. Patented Oct. 10, 1911.

Application filed January 17, 1910. Serial No. 538,443.

*To all whom it may concern:*

Be it known that I, HENRY EILERS, a citizen of the United States, residing at Emerson, in the county of Whiteside and State of Illinois, have invented certain new and useful Improvements in Hay-Loaders, of which the following is a specification.

My invention has reference to hay loaders, and pertains more specially to certain attachments for machines of that class which will render the operation thereof more perfect and satisfactory. One serious difficulty in the action of such machines as now constructed and operated, arises from the tendency of the elevator apron, in its return movement carrying the hay downwardly between the loader and rear end of the wagon, and the chief purpose of my device is to obviate this difficulty.

In the drawings: Figure 1 is a side elevation of a hay loader with my invention in place thereon. Fig. 2 shows my device in detail, in rear elevation. Fig. 3 is a detail of one of the braces 7.

1 represents the frame of a hay loader, supported on carrying wheels 2, and 3 is one of the side-pieces of the elevator frame.

4 4 are side-chains of the elevator apron, passing at the upper end of the frame 3 over wheels 5, rotatably mounted on a stationary hollow shaft 6, mounted in said frame. At each end of the shaft 6 is a U-shaped brace 7, one of the arms 8 of which is adapted to be inserted in the end of the shaft 6, and held therein by a pin 9. The lower ends of the braces 7 are projected inwardly into plates 10 to which is secured a cross-piece 11. A similar pair of U-shaped braces 12 is secured to the side of the pieces 3, and secured thereto, parallel with the member 11, is a cross-piece 13. Attached to the cross-pieces 11 and 13 is a plurality of slats 14, extending longitudinally of the machine.

It will be seen that the effect of the slats 14 and cross-pieces 11 and 13 will be to prevent the hay being carried downwardly by the action of the elevator apron, or by the force of the wind, which will assist in holding the hay in contact with the apron when blowing toward the rear of the wagon to which the hay is being delivered. It is necessary to have the braces 7 and 12 projected outwardly from the points of support thereof, in order to clear the sides of the elevator apron, and chains 4 of said apron.

If desired, the upper braces 7 can be constructed similarly to the braces 12, and attached to the side-pieces 3, similarly to said last-named braces. This would become necessary if the device was used in connection with a machine not provided with the hollow shaft 6.

What I claim as my invention, and desire to secure by Letters Patent of the United States, is:

The combination with the frame of a hay-loader and endless elevator apron supported therein, of a pair of cross-pieces; U-shaped braces connecting said cross-pieces with the frame and extending outwardly around the edges of the elevator apron; and a plurality of slats secured to said cross-pieces, longitudinally of the machine.

In testimony whereof I affix my signature in presence of two witnesses.

HENRY EILERS.

Witnesses:
R. W. E. MITCHELL,
W. N. HASKELL.

Copies of this patent may be obtained for five cents each, by addressing the "Commissioner of Patents, Washington, D. C."